(12) United States Patent
Hine et al.

(10) Patent No.: US 9,720,520 B2
(45) Date of Patent: Aug. 1, 2017

(54) IMAGING INPUT/OUTPUT WITH SHARED SPATIAL MODULATOR

(71) Applicant: TEXAS INSTRUMENTS INCORPORATED, Dallas, TX (US)

(72) Inventors: Matthew Glen Hine, Richardson, TX (US); Gene Alan Frantz, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/844,690

(22) Filed: Sep. 3, 2015

(65) Prior Publication Data

US 2015/0378449 A1 Dec. 31, 2015

Related U.S. Application Data

(63) Continuation of application No. 12/728,074, filed on Mar. 19, 2010, now Pat. No. 9,160,996, which is a continuation-in-part of application No. 12/608,646, filed on Oct. 29, 2009, now abandoned, which is a continuation-in-part of application No. 12/493,865, filed on Jun. 29, 2009, now abandoned, said application No. 12/728,074 is a continuation-in-part of application No. 12/334,240, filed on Dec. 12, 2008, now Pat. No. 8,690,340.

(60) Provisional application No. 61/109,349, filed on Oct. 29, 2008, provisional application No. 61/076,536, filed on Jun. 27, 2008, provisional application No.
(Continued)

(51) Int. Cl.
*H04N 9/31* (2006.01)
*G06F 3/03* (2006.01)
*G06F 3/01* (2006.01)
*H04N 5/74* (2006.01)
*G02B 26/06* (2006.01)
*H04N 13/04* (2006.01)

(52) U.S. Cl.
CPC ........ *G06F 3/0304* (2013.01); *G02B 26/06* (2013.01); *G06F 3/017* (2013.01); *H04N 5/7458* (2013.01); *H04N 9/315* (2013.01); *H04N 9/3111* (2013.01); *H04N 9/3197* (2013.01); *H04N 13/0427* (2013.01); *H04N 13/0459* (2013.01)

(58) Field of Classification Search
USPC ........................ 353/42, 30, 31; 348/333.1
See application file for complete search history.

(56) References Cited

U.S. PATENT DOCUMENTS 5,212,555 A 5/1993 Stoltz
5,214,420 A 5/1993 Thompson et al.
(Continued)

FOREIGN PATENT DOCUMENTS

GB 2352512 A * 1/2001 .......... A61B 5/0088

*Primary Examiner* — Sultan Chowdhury
*Assistant Examiner* — Danell L Owens
(74) *Attorney, Agent, or Firm* — Michael A. Davis, Jr.; Charles A. Brill; Frank D. Cimino (57) ABSTRACT

An image input/output apparatus and method includes a light source in optical communication with a spatial radiation modulator for projecting an output image and an image sensor for capturing an input image along a shared input/output path. In a described embodiment, the display of an output image and the capture of an input image is effected using a common spatial radiation modulator (SRM) in the form of a deformable mirror device (DMD).

11 Claims, 4 Drawing Sheets

Related U.S. Application Data

61/161,912, filed on Mar. 20, 2009, provisional application No. 61/162,048, filed on Mar. 20, 2009, provisional application No. 61/162,508, filed on Mar. 23, 2009, provisional application No. 61/162,668, filed on Mar. 23, 2009, provisional application No. 61/165,353, filed on Mar. 31, 2009.

(56) References Cited

U.S. PATENT DOCUMENTS

| | | | |
|---|---|---|---|
| 5,254,980 A | 10/1993 | Hendrix et al. | |
| 5,319,491 A | 6/1994 | Selbrede | |
| 5,612,736 A * | 3/1997 | Vogeley | G06F 3/0386 |
| | | | 348/207.99 |
| 7,042,618 B2 | 5/2006 | Selbrede et al. | |
| 7,092,142 B2 | 8/2006 | Selebrede et al. | |
| 7,256,927 B2 | 8/2007 | Selbrede | |
| 7,449,759 B2 | 11/2008 | Selbrede et al. | |
| 7,486,854 B2 | 2/2009 | Van Ostrand et al. | |
| 7,515,326 B2 | 4/2009 | Selbrede et al. | |
| 7,522,354 B2 | 4/2009 | Selebrede et al. | |
| 2006/0289760 A1 | 12/2006 | Bathiche | |
| 2008/0179507 A2 | 7/2008 | Han | |
| 2009/0029691 A1 * | 1/2009 | Shen | H04W 76/02 |
| | | | 455/418 |
| 2009/0043211 A1 | 2/2009 | Ting et al. | |
| 2009/0219713 A1 | 9/2009 | Siemiet et al. | |

* cited by examiner

IMAGING INPUT/OUTPUT WITH SHARED SPATIAL MODULATOR

RELATED PATENT APPLICATIONS

This application is a continuation of U.S. application Ser. No. 12/728,074 filed Mar. 19, 2010; which is a continuation-in-part of U.S. application Ser. No. 12/608,646 filed Oct. 29, 2009; which claims the benefit of U.S. Provisional Application No. 61/109,349 filed Oct. 29, 2008; and which is a continuation-in-part of U.S. application Ser. No. 12/493,865 filed Jun. 29, 2009, which claims the benefit of U.S. Provisional Application No. 61/076,536 filed Jun. 27, 2008; the entireties of all of which are also incorporated herein by reference.

U.S. application Ser. No. 12/728,074 is a continuation-in-part of U.S. application Ser. No. 12/334,240 filed Dec. 12, 2008; now U.S. Pat. No. 8,690,340 issued Apr. 8, 2014; the entirety of which is incorporated herein by reference.

U.S. application Ser. No. 12/728,074 also claims the benefit of U.S. Provisional Application No. 61/161,912 filed Mar. 20, 2009; U.S. Provisional Application No. 61/162,048 filed Mar. 20, 2009; U.S. Provisional Application No. 61/162,508 filed Mar. 23, 2009; U.S. Provisional Application No. 61/162,668 filed Mar. 23, 2009; and U.S. Provisional Application No. 61/165,353 filed Mar. 31, 2009; the entireties of all of which are also incorporated herein by reference.

TECHNICAL FIELD

This invention relates to methods and devices for image output, such as for projection of images onto image display surfaces; and, more specifically, to such methods and devices that use shared resources to also include capability for image input, such as for recording of images by cameras or other image sensing devices utilizing shared optical or other radiation paths for image input and output. The invention finds particular application in systems that utilize spatial light modulators, such as deformable micromirror devices, for sharing image input and output radiation paths.

BACKGROUND

Spatial light modulators (SLMs) are devices used to control the distribution of light in an optical system. SLMs are typically configured as one or two-dimensional arrays of individually addressable optical elements, representing pixels of an image. These elements modify either the amplitude or the phase of the light distribution within the optical system.

SLMs can be divided into various types, including an electro-optic, magneto-optic, liquid crystal, and deformable mirror devices. These different types may be further characterized according to whether they are suitable for amplitude modulation, phase modulation, etc.

SLMs and their applications are described in various patents and patent applications. An example visual display system having a spatial light modulator with individually controllable elements, wherein each element is capable of producing an individual light beam directed toward a display surface, is described in U.S. Pat. No. 5,214,420, entitled "Spatial Light Modulator Projection System with Random Polarity Light." An example method and structure for providing system control to a spatial light modulator display is described in U.S. Pat. No. 5,254,980, entitled "DMD Display System Controller." The entireties of both patents are incorporated by reference herein.

Many applications involve using SLMs in display systems, where an SLM optics unit replaces a raster scan unit. These are image output generation systems, in which the SLM receives input data in the form of electrical signals for the purpose of determining how light is to be reflected by its pixel elements as light output to a display screen, printer, or other such equipment. Thus, SLMs are traditionally used to transform an electrical signal to light patterns, and thereby generate an image output.

Conventional means for creating an electrical output signal from a captured input image as an electronic signal, as opposed to recreating an output image from an input signal, do not typically involve the use of SLMs. In many applications the light receiving device is a photosensor array, in which an array of photosensor elements is used to differentiate pixels of the image. Each element of the array generates a signal corresponding to a pixel point of the image. This signal can be transmitted, digitized, or otherwise processed for reconstitution into an image at a desired time and place.

A system for capturing an input image using SLM optics with a single-element sensor is described in U.S. Pat. No. 5,212,555, entitled "Image Capture with Spatial Light Modulator and Single-Cell Photosensor"; the entirety of which is incorporated herein by reference. In this arrangement, as each pixel element in an SLM array is individually switched into a light reflecting position, light from the respective pixel is directed to a sensor which generates a signal proportional to the light associated with that pixel element, the result being a series of individual pixel output signals, together representing an input image frame. The entirety of that patent is incorporated by reference herein.

Such systems do not, however, provide image input and image output capability in a same shared resource system.

SUMMARY

One aspect of the invention relates to methods and apparatus for providing imaging input and imaging output capability in a same shared resource system.

In described embodiments, a spatial radiation modulator (SRM) unit comprising an array of individually addressable and positionable reflecting surfaces receives input data in the form of electrical input signals for the purpose of determining how radiation incident on the surfaces should be reflected to form respective pixel elements of an output image for display onto a display screen, printer, or other imaging surface or target. The spatial modulator unit may, in some embodiments, take the form of a deformable mirror device having an array of individually addressable and positionable specular surfaces that respectively reflect light incident from one or more output light sources via an output imaging path, such as an optical lens path, to form a composite output image on an imaging plane. At least some of the same specular surfaces are individually repositionable to respectively reflect radiation incident from an input image field of view of the same SRM unit onto a camera or other radiation sensor along an input imaging path to provide electrical output signals representative of a viewed input image. In some embodiments, at least some portions of the input imaging path and the output imaging path may utilize common resources. The radiation incident from the input image field of view may take the form of light or, alternatively, may take the form of other radiation, such as radiation at a low-terahertz frequency.

In a non-limiting example embodiment, described in greater detail below, a system for providing imaging input/output using a shared spatial modulator uses a deformable mirror device (DMD) unit having an array of specular surface elements which are individually addressable and switchable from positions reflecting light incident from a light source onto respective pixel locations of an imaging plane of an output display, to positions reflecting radiation from an input image field of view to a photosensitive element of a camera or other photosensor, for generating electrical output signals proportional to intensity or other characteristic parameter of the received radiation. In one form, the input image radiation is radiation received from an imaged subject located between the DMD unit and the output image imaging plane. In another form, the input imaging radiation is radiation received from an imaged subject located from the DMD unit beyond the output image imaging plane.

The shared spatial modulator input/output imaging system may be used in various applications, such as disclosed, for example, in the various Provisional Applications from which this application claims priority and the entireties of which have been incorporated herein.

For so-called backlighting arrangements, in which an output image is displayed on one side of an imaging display surface for viewing from an opposite side of such surface, a switchable diffusion screen may be employed for coordinated switching of the diffusion characteristic in blanket or pixel-selectable way with respect to the input imaging path for the capture of the input image.

The SRM unit may comprise lenses and other optics elements in the image projection and image reception paths, at least some of which may be common to both the output and input imaging paths.

The SRM will typically be comprised of an array of reflective pixel elements, which are individually addressable and switchable, such that a series of pixel-reflected light or other radiation beams are reflected from the SM as different pixel elements are switched. A defocusing lens focusing said pixel-reflected light onto a single-cell photosensor. The SRM is in communication with timing means for controlling the switching of its pixel elements, such that individual pixel elements representing image pixels are addressed in synchronization according to the desired characteristics of the image projection or capturing modes.

The unit may be used in digital or analog systems, for printing or display applications with equipment that is remote or in-line with the radiation focusing and control elements. For digital applications, the output signals of the input imaging modes may be digitized and may be subjected to digital signaling processing or stored.

In both the output imaging and input imaging processes, the SRM enables differentiation among individual pixel elements. In certain advantageous embodiments, information received from the input image process may be used to control one or more parameters of the output image process.

DETAILED DESCRIPTION OF EXAMPLE EMBODIMENTS

Described example embodiments are presented by way of non-limiting illustration of some of the many ways the claimed invention may be implemented. For purposes of simplicity only, although other types of spatial modulators may also be utilized, the example embodiments are shown in the context of systems utilizing spatial modulators of the deformable mirror device type, such as the DLP™ spatial light modulators commercially available from Texas Instruments Incorporated, Dallas, Tex.

Figure 1:
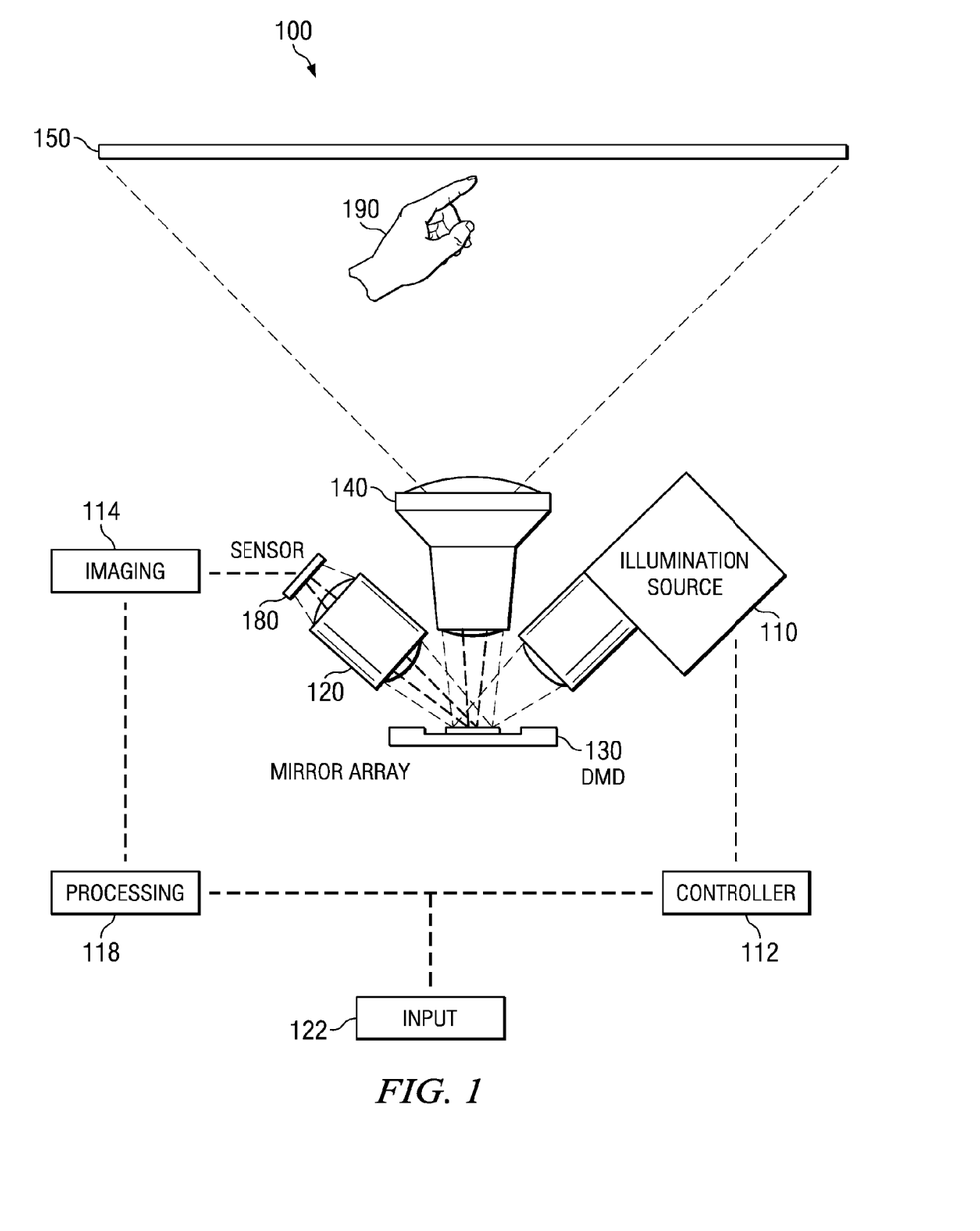
FIG. 1 shows an arrangement of an embodiment illustrating principles of the invention.
Figure 2:
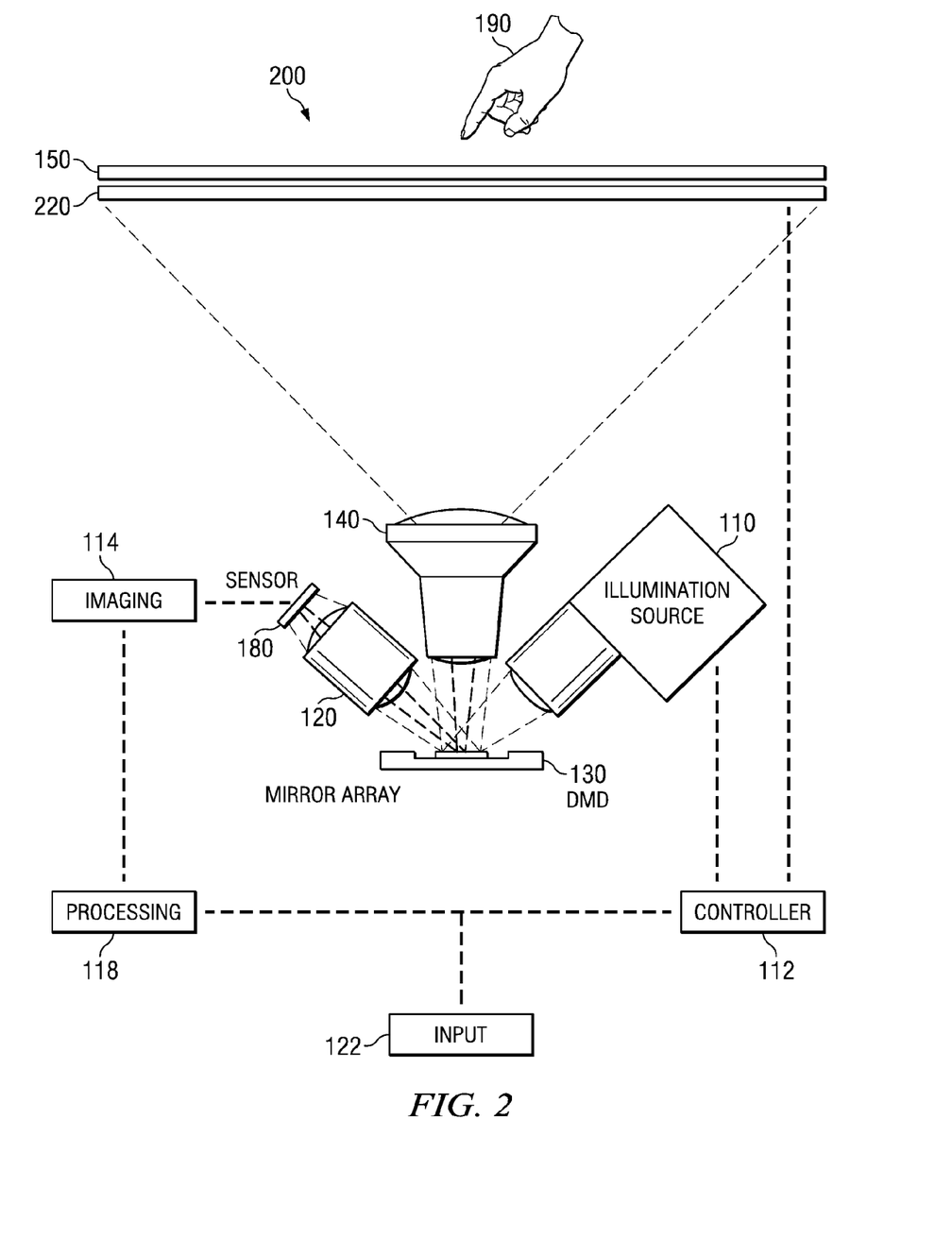
FIG. 2 shows a modified form of the arrangement of FIG. 1.
Figure 3:
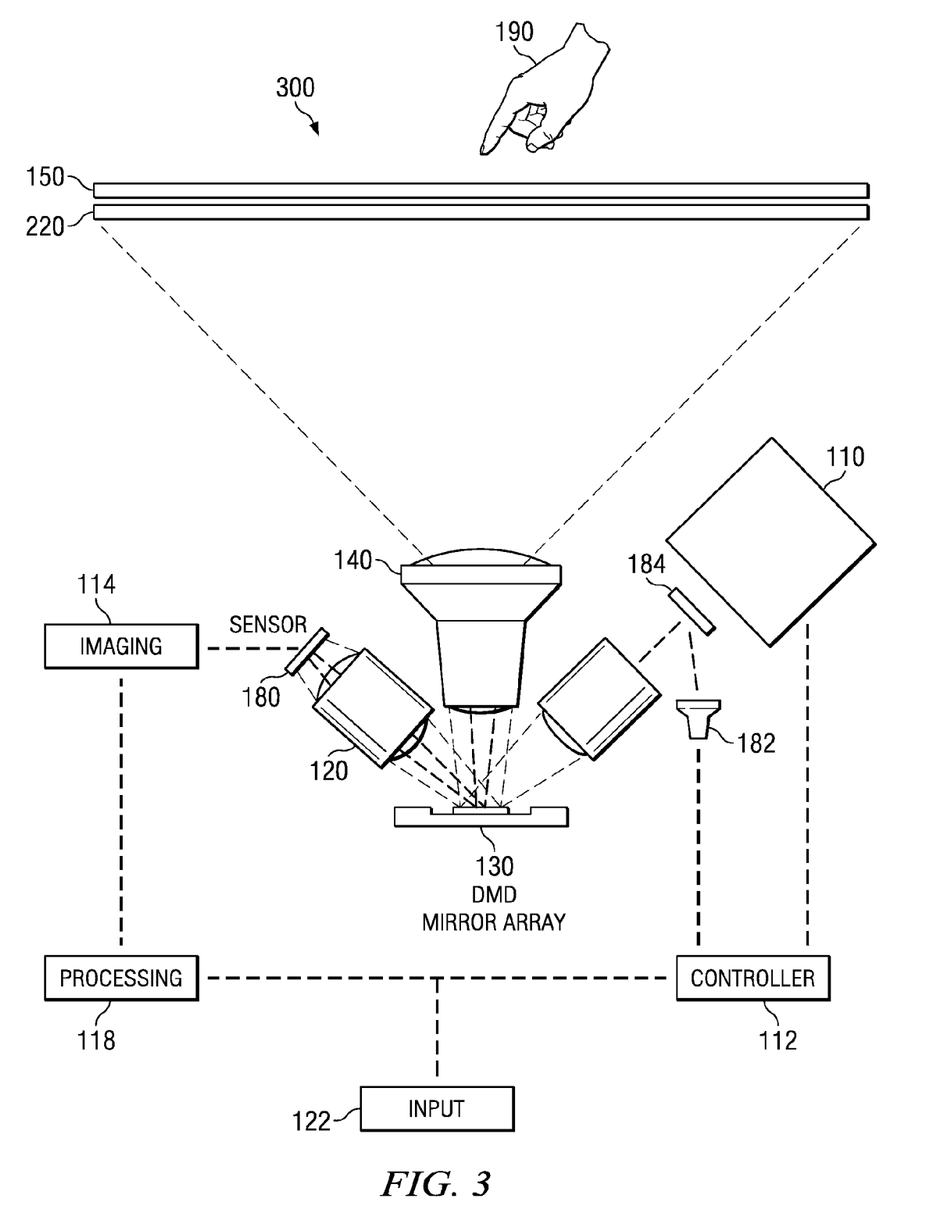
FIG. 3 shows another modified form of the arrangement of FIG. 1.

In an image projection (image output) application mode, a spatial radiation modulator (SRM), such as a DLP™ spatial light modulator 130 shown in FIGS. 1-3, receives light from an illumination source 110 incident on an array of individually addressable and positionable specular reflecting elements. A controller 112 is responsive to electrical input signals to set the positions of the individual reflecting elements to reflecting ("on") or non-reflecting ("off") positions corresponding to whether respective corresponding pixel locations in an output image should be illuminated or not illuminated. The SRM 130 then directs the modulated light, with the assistance of various lenses and other optical devices 140 in an output imaging optical path, onto an imaging plane of a display 150 (or other imaging surface or target) for formation of an output image. The display 150 may be an opaque surface such as a screen in a conference room, or may be a transparent or translucent surface such as a display screen of a computer monitor.

In an image capture (image input) application mode, the SRM 130 receives light from an image capture subject 190 incident on individual ones of the reflecting elements of the same array for corresponding individual element reflections to a camera or other sensor element 180 via an input imaging radiation path that may include various lenses or other elements 140 common with the output imaging path and/or may include other lenses or elements 120. An imaging unit 114 cooperates with the sensor element 180 to receive and buffer electrical output signals corresponding to the imaging information received by the sensor 180, which are then communicated for further signal processing to a processing unit 118, which may include one or more digital signal processors, microprocessors and/or other signal processing components.

In an advantageous form of the illustrated implementation, the processing unit 118 and controller 112 may be communicated so that information obtained from a captured input image may be used for control of one or more parameters of the output image process. For example, the processing unit 118 may include instructions for analyzing image data received from the imaging unit 114 to identify gestures of a human subject interacting with an output image displayed on the display 150. The identified gestures may then be used to cause a response, such as by causing the controller 112 to shift a position, enlarge a portion, open an image window, etc. in the displayer output image.

An input unit (or input/output unit) 122 is connected for human or machine interface purposes to the input/output imaging system. For example, the input unit 122 may take the form of a keyboard and/or mouse for interacting with the controller 112 and/or processing unit 118. The input unit 122 may also provide porting for input/output electrical signal communication from/to external processing or other electronic circuitry.

FIG. 1 illustrates the case in which an output image is projected via individually addressable and positionable specular reflecting elements in a DMD mirror array onto a screen or other display surface 150 using a front projection mode. Such arrangement is typical of conference room overhead image projection systems, wherein an output image is projected onto the front of an opaque screen. In such situations, it is not uncommon for a human subject (viz., a presenter) 190 to stand in front of the screen and gesture to portions of the projected image (viz., in connection with points made in a In accordance with features of the described embodiment, an image of the human subject may be captured at imaging unit 114 using the described image input process, and the image subject may be analyzed in signal processing at processing unit 118 (or externally via communication from input/output unit 122). Features or actions of the subject 190 may then be identified and used for providing input to controller 112, for modification of the image output process or taking other action responsive thereto. For example, an identification may be made of a gesture of the subject 190 and the output imaging process can be controlled to respond to the identified gesture to modify the displayed image or modify one or more parameters of the displayed image (viewing area, size, highlighting, animation, etc.). There is no requirement that the subject be in contact with the display screen 150.

The arrangement of FIG. 1 may also be used for teleconferencing in addition to/or as an alternative to gesture recognition. In such arrangement, the image of the human subject 190 can be captured and transmitted to a remote location.

Advantageously, the illustrated image input radiation path may include the same elements 140 from the subject 190 to the SRM 130 as the image optical path, thereby providing an image capture field of view for the input image sensor 180 that may partly or completely overlap or coincide with the projection field of view for the projected output image. Such field of view overlap or coincidence has advantages over, for example, video conferencing systems which employ cameras and projectors having different vantage points.

FIG. 2 illustrates the case in which an output image is projected via individually addressable and positionable specular reflecting elements in a DMD mirror array onto a display surface 150 using a rear projection mode. Such arrangement is typical of rear projection screens such as used as peripheral display devices for personal computers and the like. The same arrangement is used for rear projection advertising displays, large format televisions, etc. Here the output image is projected onto the back of a, typically, partially transparent or translucent screen 150. In such situations, a human subject (viz., a PC user, presenter or viewer) 190 is often positioned in front of the screen (that is, on the side opposite to the side onto which the image is projected).

The elements of the input/output imaging system of FIG. 2 may be largely similar to those for the arrangement shown in FIG. 1. One difference may be the inclusion in a rear projection system of a diffusion screen 220, to provide a diffusing surface at the imaging plane. The presence of the diffusing surface may be an obstacle to the imaging input of a subject 190 located on an opposite side of the screen 150 from the side on which the output image is formed. This can be overcome by providing a switchable diffuser 220 whose switching is cooperated with the operation of the image input and output modulation switching, such as by connection to the controller 112. The diffuser 220 may be made switchable in its entirety, or on a separately addressable (viz., row and column) individual pixel or segment location basis. In this way, the timing of image capture can be synchronized with switching of the diffuser so that the diffuser is made clear (or effectively rendered clear) at least at locations through which input imaging of the subject 190 is to be made. Again, there is no requirement that the subject be in contact with the display screen 150; where, however, the input imaging function will used only for imaging a subject or areas of a subject in contact with the display screen (such as, for example, in touch screen detection), considerations of correcting for diffusion may not apply.

One implementation of a locally switchable diffuser utilizes a local electric field applied at a pixel location to deform a flexible membrane substrate to bring it locally at selectively addressable pixel locations into contact with another substrate. The local deformation can be brought about using a mechanism such as used in the Time Multiplexed Optical Shutter (TMOS) display methodology disclosed in the issued patents of Unipixel™ Displays, Inc., The Woodlands, Tex. (e.g., U.S. Pat. Nos. 5,319,491; 7,042, 618; 7,092,142; 7,256,927; 7,486,854; 7,449,759; 7,515, 326; 7,522,354; 7,535,611), the entireties of all of which are incorporated herein by reference. In one embodiment usable herein, the membranes could be arranged to provide a normally diffusing pixel location onto which a corresponding pixel of the output image can be displayed and a non-diffused pixel location providing a clear optical path upon selective application (or non-application) of a local electric field. The selectivity of the clear pixel locations can be synchronized with the positioning of the movable surfaces of the corresponding pixels of the SRM 130, so that diffusion is presented for the output imaging process and transparency is presented for the input imaging process. Other arrangements are possible.

It will be appreciated that imaging through a diffusion screen 220 may create artifacts or effects that can also be compensated for by applying image correction algorithms in software, as for example by executing a set of non-transient program instructions in the signal processing externally or at processing unit 118, or by applying image correction algorithms in hardware, or partially in software and partially in hardware, used programmable logic gates or other logic arrangements.

FIG. 3 shows a rear projection arrangement similar to that of FIG. 2, but which avoids issues associated with diffusion by utilizing radiation for which the diffuser 220 is effectively transparent. Such radiation may be found in parts of the electromagnetic spectrum, for example, separated from the parts commonly considered to be in the visible light range. An advantageous candidate for this purpose is electromagnetic energy in the terahertz frequency range. Such radiation has the characteristic that it can be directed by the same reflecting surfaces of, e.g., a DMD mirror array, yet will pass unobstructed through a common diffuser 220.

As shown in FIG. 3, a source of terahertz frequency electromagnetic radiation 182 can be positioned to be incident on a partially reflecting mirror 184 or the like, to irradiate the subject 190 along the same radiation path as the optical path used for the output image. The terahertz frequency characteristic enables the radiation to be directed by the individually switchable elements of the array 130, then pass through the effectively transparent diffuser 220. The radiation can then reflect off the subject 190, back through the diffuser 220 and be captured by a sensor 180 which is sensitive to radiation in the terahertz frequency range. The captured radiation image can then be analyzed to identify gestures, etc.

This of the projection having common elements with the image, and because the image input system uses shared elements with the image output Because the subject is imaged through the same ed region, location size, consider, e.g., the location in an of a pointing finger could be identified input process as part of surface located in front of surface onto which the output image is directed with the screen or enlacause a response in the is responsive to electrical input signals to set the positions of the individual specular reflecting elements to reflecting ("on") or non-reflecting ("off") positions corresponding to the illumination intensities of respective corresponding pixel locations in an output image. The SRM 130 then directs the modulated light, with the assistance of various lenses and other optical devices in an output imaging optical path, for formation of an output image onto an imaging plane (or other imaging surface or target) of a display 150, which may be an opaque surface, such as a wall screen in a conference room, or a transparent or translucent surface, such as a display screen of a computer monitor. Information received from the input image process may be used to control one or more parameters of the output image process.

The embodiment is described in terms of implementing SRM 130 with a deformable mirror device (DMD). However, the invention is not limited to the use of DMDs for SRM 130 and may be implemented with other types of SRMs. A common characteristic of a suitable SRM device is the ability to reflect light from pixel elements that are individually addressable.

DMD 130 is a deformable mirror device (DMD), which is used to reflect points of light incident from illumination source 110 or incident from subject 190 as pixels, on a selectable pixel by pixel basis. DMDs are a type of spatial light modulator having an array of reflective pixel elements. Each reflective element represents a pixel element, and each is electronically addressable and capable of separate mechanical movement in response to an electrical input. For display, each pixel element is switched so that it is tilted to one of a number of positions.

An example DMD device is the DLP™ device manufactured by Texas Instruments Incorporated, Dallas, Tex., in which each pixel element is associated with a memory cell and may be individually addressed. Other DMD devices may be used, and are characterized by various types of architectures. The mirror elements may be moveable by means of torsion-beam or cantilever supports, or may be elastomer or membrane designs. Addressing may be achieved by an e-beam input, optically, or by integrated circuits.

Figure 4:
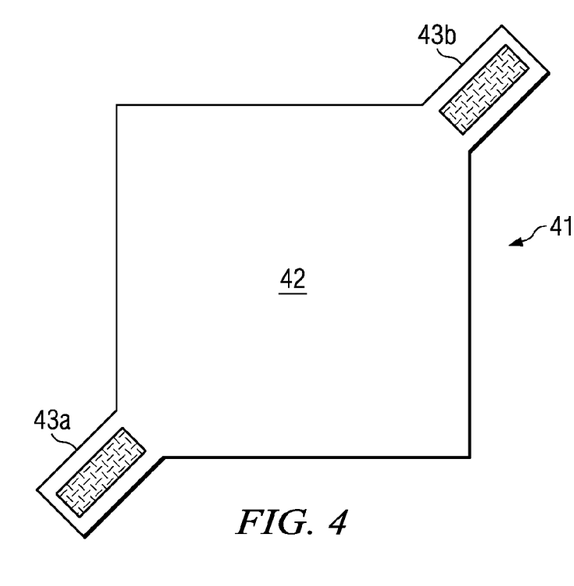
FIGS. 4 and 5 show components of a spatial radiation modulator usable in the arrangements of FIGS. 1-3.
Figure 5:
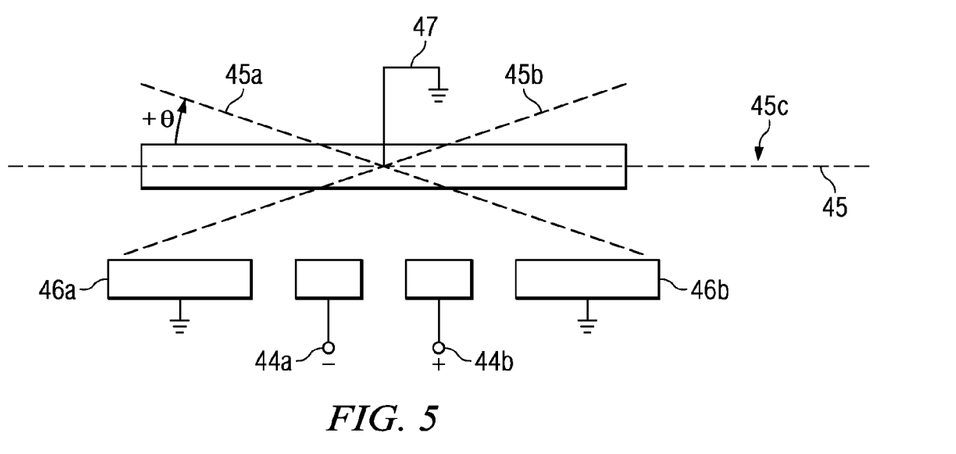

FIGS. 4 and 5 illustrate a movable pixel element 41, representative of the pixel elements that comprise the pixel array of the DMD mirror array 130. When pixel element 41 is placed in one position, it is directed (oriented) to reflect light incident from illumination source 110 through the projection lens 140 and onto the imaging surface 150. When pixel element 41 is placed in another position, it is directed to reflect light (or other radiation) incident from the subject 190 through the lens 140 and onto the sensor 180.

The pixel element 41 of FIGS. 4 and 5 is of a torsion-beam design, where a thick reflective beam, i.e., mirror 42, is suspended over an air gap and connected between two rigid supports by two thin torsion hinges 43a and 43b that are under tension. When an address electrode 44a or 44b, underlying one-half of mirror 42, is energized, the torsion hinges 43a and 43b are twisted and mirror 42 rotates about the axis of the two hinges 43a and 43b.

The movement of mirror 42 is shown in FIG. 5. Mirror 42 moves about an axis from a position shown by the dotted line 45a (viz., position for reflecting light from illumination source 110 to display screen 150) to a position shown by the dotted line 45b (viz., position for reflecting light from subject 190 to sensor 180). In one position, the edge of mirror 42 touches a landing electrode 46b; and in another position, the edge of mirror 42 touches a landing electrode 46a. Mirror 42 is rotated between positions by applying appropriate opposite voltages to address electrodes 44a, 44b. A differential bias is applied to mirror 42 through electrode 47.

The torsion-beam pixel of FIGS. 4 and 5 is only one type of pixel architecture, and many other architectures are possible. These are distinguished by characteristics such as their deformation mode, pixel shape, and the hinge support architecture. However, for purposes of application herein, any sort of architecture is satisfactory that enables independent movement of the pixel elements.

DMD mirror array 130 is addressed pixel by pixel, moving individual mirrors 42 between their individually selected positions as appropriate to provide the desired image output and image input functions. The control for addressing and switching of the pixel elements of the array 130 in the illustrated arrangements is provided by controller 112. Such control may, however, be provided by a separate array control element. Controller 112 also includes means for generating timing signals for the coordination of the output and input imaging functions. U.S. Pat. No. 5,214,420, "Spatial Light Modulator Projection System with Random Polarity Light," the entirety of which is incorporated herein by reference, describes a method of addressing the individual pixels. Using such method, controller 112 includes a decoder that receives a row address and decodes the address to select the desired row of pixels. Similar means may be used to select the column of a pixel to be addressed. If pixels are to be addressed on a column-by-column, row-by-row basis, simple position-shifting techniques may be used to enhance speed of operation.

OTHER EMBODIMENTS

Those skilled in the art to which the invention relates will appreciate that the described example embodiment and its various arrangements is illustrative of just some of the many possible embodiments and modifications of embodiments that can be implemented within the scope of the claimed invention.

What is claimed is:

1. A system for displaying and capturing images, comprising:
   a radiation source;
   a spatial radiation modulator positioned to receive radiation from the radiation source and direct the radiation for display of at least portions of an image to a display location, responsive to first position settings of individually addressable radiation reflecting members of the spatial radiation modulator; and
   a radiation sensor positioned to capture at least portions of an image of a subject positioned adjacent the display location, the spatial radiation modulator positioned to receive radiation from the display location and direct the received radiation to the radiation sensor responsive to second position settings of the individually addressable radiation reflecting members;

wherein the displayed image is displayed on one side of an imaging display surface for viewing from an opposite side of the surface; and the system further comprises a switchable diffusion screen for coordinated switching of a diffusion characteristic for capture of the image of the subject on the opposite side of the surface.

2. The system of claim 1, wherein the spatial radiation modulator is a deformable mirror device.

3. The system of claim 1, further comprising circuitry for shifting the mirror members between the first and second position settings responsive to action of a human viewer detected in response to information obtained from the captured image of the subject.

4. The system of claim 3, wherein the circuitry further comprises circuitry for selecting the displayed image responsive to the action of the human viewer.

5. The system of claim 4, wherein the circuitry further comprises circuitry for adding at least a portion of an image of the human viewer to the displayed image.

6. A system for displaying and capturing images, comprising:
 a radiation source;
 a spatial radiation modulator positioned to receive radiation from the radiation source and direct the radiation for display of a first image to a display location, responsive to first position settings of individually addressable radiation reflecting members of the spatial radiation modulator;
 a radiation sensor positioned to capture a second image of a subject positioned adjacent the display location, the spatial radiation modulator positioned to receive radiation from the display location and direct the received radiation to the radiation sensor responsive to second position settings of the individually addressable radiation reflecting members utilizing radiation paths having at least partially common paths, wherein the at least partially common paths both include the same spatial radiation modulator and wherein the radiation includes electromagnetic radiation having a frequency in the terahertz region of the electromagnetic spectrum.

7. The system of claim 6, wherein the spatial radiation modulator is a deformable mirror device.

8. The system of claim 7, further comprising circuitry for shifting the mirror members between the first and second position settings responsive to action of a human viewer detected in response to information obtained from the captured image of the subject.

9. The system of claim 8, wherein the circuitry further comprises circuitry for selecting the displayed image responsive to the action of the human viewer.

10. The system of claim 9, wherein the circuitry further comprises circuitry for adding at least a portion of an image of the human viewer to the displayed image.

11. A system for displaying and capturing images, comprising:
 a radiation source;
 a spatial radiation modulator positioned to receive radiation from the radiation source and direct the radiation for display of a projected image to a display location in a first field of view, responsive to first position settings of individually addressable radiation reflecting members of the spatial radiation modulator;
 a radiation sensor positioned to capture a captured image of a subject positioned adjacent the display location in a second field of view, wherein the first field of view and the second field of view at least partially overlap, the spatial radiation modulator positioned to receive radiation from the second field of view and direct the received radiation to the radiation sensor responsive to second position settings of the individually addressable radiation reflecting members;
 wherein a radiation path of the captured image and a radiation path of the projected image have at least partially common paths, wherein the at least partially common paths both include the same spatial radiation modulator and wherein the radiation includes electromagnetic radiation having a frequency in the terahertz region of the electromagnetic spectrum.

* * * * *